Sept. 19, 1933.   G. T. BALFE   1,927,450
GASKET
Filed Oct. 26, 1929

INVENTOR.
George T. Balfe
BY
Parker & Burton
ATTORNEYS

Patented Sept. 19, 1933

1,927,450

UNITED STATES PATENT OFFICE 1,927,450

GASKET

George T. Balfe, Detroit, Mich., assignor to Detroit Gasket & Mfg. Co., Detroit, Mich., a corporation of Michigan Application October 26, 1929. Serial No. 402,589

4 Claims. (Cl. 288—1)

My invention relates to improvements in gaskets.

An object of my invention is to provide a gasket so formed, constructed and reinforced that it will effectively serve the purpose for which it is designed and seal the joint wherein it is interposed against high pressures and under severe working conditions, and which will withstand hard usage throughout a long period of time. The gasket is of such a character that if a break occurs therein at one place it will strongly resist any tendency of the break to spread or extend to any other part of the gasket.

There is a tendency in gaskets generally for a break once started to spread due to the pressure acting upon the broken portion of the gasket and extending the break to other parts of the gasket. This tendency toward quick spreading of a break and "blowing" of a gasket became particularly marked upon the advent of high compression and high speed motors. Heretofore, attempts have been made to overcome this weakness in the conventional type of gasket by resorting to various types of reinforcing and binding means along the gasket edge and particularly the edge which is exposed to the high pressure in the combustion chamber. Since the construction of the body of the gasket remains the same, this does not overcome the quick "blowing" of the gasket when the reinforced edge breaks down. The construction of my improved gasket is such that this tendency is resisted and the break is localized where it occurs. This produces a gasket of greatly increased life and service. It is particularly advantageous in connection with gaskets adapted to serve as packing for a number of joints at which pressure is maintained and which are located close together so that a break starting at one point in the gasket might readily spread through the gasket and open up another point on another joint. An example is the gasket provided for a multiple compression chamber internal combustion engine.

An object of the invention is to provide a gasket which offers through its width a multiplicity of successive metal barriers to the heat and pressure which cause blowing of the gasket. In other words, instead of a single reinforced or non-reinforced barrier around the edge of the gasket, I provide throughout the entire width of the gasket and over substantially its entire area a large number of these barriers which, by extending throughout the thickness or width of the gasket, offer successively available walls to resist blowing, should the edge exposed to the high heat and pressure for any reason break down.

In my invention, there is provided a sheet metal layer having struck therefrom closely compacted and readily deformable tangs which extend to the surfaces of the cushion layers, so as to provide throughout the width or thickness of the gasket readily deformable and yieldable metal tangs which, by reason of their closely compacted character, form the successive barriers. Such a construction affords a metal reinforce which may be economically manufactured, retains the desired strength of the original metal sheet, and affords, between the tangs and the openings from which they are struck, supporting portions for the cushion layers. The ready deformability of the tangs permits quick and economic assembly of the metallic reinforce or insert with the cushion layers and permits the desired gasket compressibility, notwithstanding the projection of the tangs to the surfaces of the cushion layers.

As illustrated, the tangs may be left exposed, if desired. Such a construction may at times be extremely useful because of the high heat conductivity afforded by the tangs exposed at the surfaces of the cushion layers. This conductivity is not destroyed should it be desirable to employ the conventional coating of graphite or similar material on the exposed surfaces of the cushion layers.

Other objects, advantages and meritorious features of my invention will more fully appear from the following description, appended claims and accompanying drawing, wherein,—

My invention relates to an improved gasket wherein there is provided a metal insert which preferably is disposed between layers of suitable packing material such as a composition asbestos, asphalt, or other fibrous material. The metal insert is overlaid preferably on both sides and at least on one side by a layer or layers of packing material.

Figure 2:
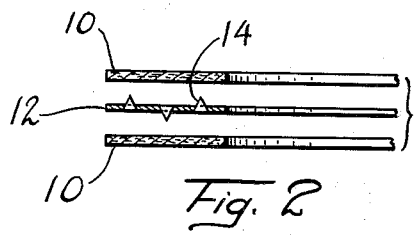
Fig. 2 is a cross-sectional view taken on line 2—2 of Fig. 1 showing the several layers which comprise the gasket separated.

In the first four figures of the drawing I have shown the invention as embodied in a simple gasket adapted to seal a single joint. In Fig. 2 this gasket is shown as consisting of three layers of material. There are two outer layers each indicated as 10 which are of suitable packing material as described. There is an inner layer in the form of a metal insert 12 which is interposed between the two outer layers 10. This metal insert 12 has small projecting tongue-like portions 14 extending outwardly from each side. These may be struck up from the sheet metal itself. Preferably they are relatively small and pointed and arranged compactly together. By arranging the projections closely together and forming them of sufficient length to extend to the surfaces of layers of cushion material, they provide a multiplicity of substantially continuous barriers extending throughout the thickness of the gasket. I prefer tongue-like projections or tangs because of their ready deformability which facilitates assembly in manufacture and does not destroy the compressibility of the gasket. By having disposed at the surfaces of the gasket relatively thin tongue-like projections which are readily deformable, the cushion layers may be suitably compressed between the surfaces of a cylinder block and head.

Figure 1:
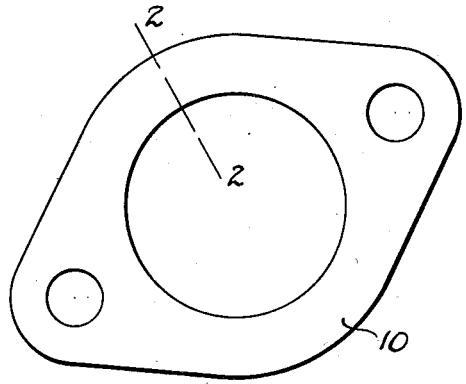
Fig. 1 is a plan of one of the packing layers shown in Fig. 3.
Figure 3:
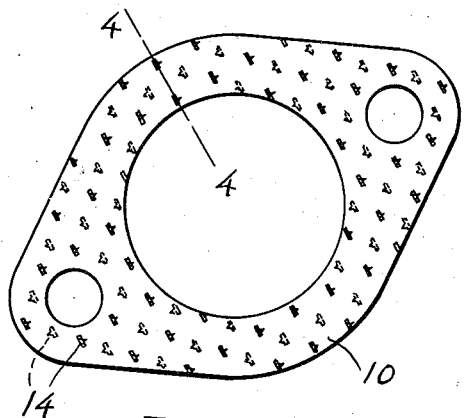
Fig. 3 is a plan of my complete gasket.
Figure 4:
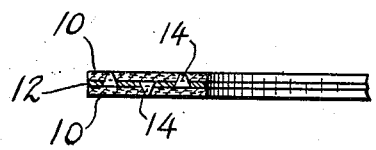
Fig. 4 is a sectional view taken on line 4—4 of Fig. 3.

In Figs. 3 and 4 I have shown the complete gasket and it will appear from these figures that the tongue-like portions 14 extend into and are embedded in the packing layers 10 and preferably extend through said layers and are clinched over on the outer faces thereof. In Figure 3, the tongue-like portions or tangs are clearly shown as bent laterally and as illustrated in Figure 4, the laterally bent portions do not form upward projections or protuberances at the surfaces of the cushion layers, which surfaces are smooth or unobstructed. It has been found in practice that the tendency of the cushion layers to expand after the tangs are clinched thereover, causes the tangs to lie substantially in or inappreciably below the surfaces, thereby providing substantially smooth cushion surfaces. It will be understood, of course, that when embedding the tangs in the cushion material and clinching the same over the cushion material, if the latter is placed under compression, as is ordinarily done in practice, the tendency of the material to expand upon release of the pressure causes the formation of smooth surface layers. The tips of the individual tangs lie in these surfaces or in hardly appreciable pockets or indentations at the surfaces, which pockets are formed by the expansion or rebound of the compressible material around the clinched-over tip. When the gasket is placed under compression in use only slight pressure is needed to recompress the material around the tang or projection tips, so that the latter, during use of the gasket, lie in the planes of the surfaces of the gasket material. By the statement in the specification and claims that the tangs are at the surfaces of the cushion layers or lie in the planes of the surfaces, is meant that in use they extend throughout the width or thickness of the gasket and provide throughout such thickness the successive barriers desired. Since the tangs extend to the surfaces over which they are clinched, they afford successive barriers through the gasket thickness or width and are at the same time independently and readily deformable under pressure to which the gasket is subjected when assembled, for example, in an internal combustion engine. A conventional coating of graphite or similar material which is customary in the art will not interfere with the usefulness of the construction either in the characteristics hereinbefore described or in the heat conducting effect of the tangs.

Figure 5:
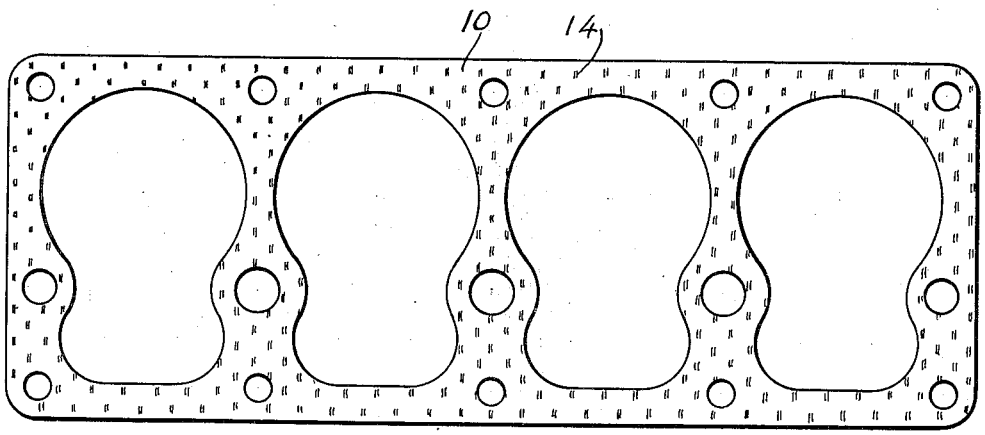
Fig. 5 is a plan of a different form of gasket embodying my invention.

In Fig. 5 I have shown the same type of construction except that the gasket is adapted for employment in conjunction with a number of joints which are closely associated such as would be found in a multiple compression chamber internal combustion engine and the arrangement of packing layers and metal insert is as described above.

It will be seen that a gasket of this kind if it blows out at any one place the tendency for the rupture to spread or extend to another place will be resisted by the barrier set up by the small protuberances 14 of the insert 12. These projections 14 extend substantially into or through the packing layers and are closely compacted so that a barrier of substantial strength is interposed against any spreading of the break and tends to localize it where it occurs.

What I claim is:

1. A packing means adapted to provide a continuous surface to surface metallic conduit comprising layers of flexible, elastic material and interposed between said layers a metallic layer having struck-up portions extending through said flexible, elastic layers, whereby to partially overcome the insulating effect of said elastic layers in transferring heat between surfaces contacting said gasket, the outer ends of said struck-up portions being bent at substantially right angles so that they lie in the plane of the outer surfaces of said flexible, elastic layers.

2. A gasket for internal combustion engines having a passage opening therethrough, comprising sheet-like layers of cushion gasket material and an insert layer therebetween of sheet metal coextensive with said cushion layers, said sheet metal layer having over its entire area relatively small, closely compacted tongue-like projections struck therefrom and extending outwardly from each side into each cushion layer to the layer surface, said projections being embedded in the cushion layers and having their ends bent and clinched over the cushion material at the surfaces thereof, and providing smooth cushion surfaces with metallic tongues embedded therein at the surfaces in heat transferring relation.

3. A gasket for internal combustion engines having a passage opening therethrough, comprising sheet-like layers of cushion gasket material and an insert layer therebetween of sheet metal coextensive with said cushion layers, said sheet metal layer having throughout its area relatively small, closely compacted tongue-like projections struck therefrom and extending outwardly from each side into each cushion layer to the surfaces thereof, said projections having their ends bent and clinched over the cushion material at the surfaces thereof without projecting thereabove whereby to provide cushion surfaces devoid of metallic projections and to afford a multiplicity of successive metallic barriers throughout the gasket thickness.

4. A gasket for internal combustion engines having a passage opening therethrough, comprising a sheet-like layer of cushion gasket material and a layer of sheet metal coextensive with said cushion layer, said sheet metal layer having throughout its area relatively small, closely compacted tongue-like projections struck therefrom and extending outwardly from one side into the cushion layer to the surface thereof, said projections having their ends bent and clinched over the cushion material at the surface thereof without projecting thereabove whereby to provide a cushion surface devoid of metallic projections and to afford a multiplicity of successive metallic barriers throughout the gasket thickness.

GEORGE T. BALFE.